(12) United States Patent
Biswas et al.

(10) Patent No.: US 8,566,833 B1
(45) Date of Patent: Oct. 22, 2013

(54) COMBINED NETWORK AND APPLICATION PROCESSING IN A MULTIPROCESSING ENVIRONMENT

(75) Inventors: Anumita Biswas, Santa Clara, CA (US); Vijay Singh, Sunnyvale, CA (US); Sonny Son, Cambell, CA (US); Bill Berryman, Sunnyvale, CA (US); Dave Noveck, Lexington, MA (US); Peter Shah, Waltham, MA (US); Jason Goldschmidt, Brookline, MA (US)

(73) Assignee: NetApp, Inc., Sunnyvale, CA (US)

( * ) Notice: Subject to any disclaimer, the term of this patent is extended or adjusted under 35 U.S.C. 154(b) by 1323 days.

(21) Appl. No.: 12/045,991

(22) Filed: Mar. 11, 2008

(51) Int. Cl.
*G06F 9/50* (2006.01)

(52) U.S. Cl.
USPC ............ 718/104; 709/213; 709/226; 718/102

(58) Field of Classification Search
USPC ............ 718/102, 104; 709/213, 226; 711/147
See application file for complete search history.

(56) References Cited

U.S. PATENT DOCUMENTS

| | | | | |
|---|---|---|---|---|
| 4,847,755 | A * | 7/1989 | Morrison et al. | 712/203 |
| 5,021,945 | A * | 6/1991 | Morrison et al. | 712/216 |
| 5,410,675 | A * | 4/1995 | Shreve et al. | 710/65 |
| 5,535,338 | A * | 7/1996 | Krause et al. | 709/222 |
| 6,078,564 | A | 6/2000 | Lakshman et al. | |
| 6,338,078 | B1 | 1/2002 | Chang et al. | |
| 6,363,477 | B1 * | 3/2002 | Fletcher et al. | 713/151 |
| 6,480,507 | B1 * | 11/2002 | Mercer et al. | 370/469 |
| 6,820,127 | B2 | 11/2004 | Banerjee | |
| 6,904,040 | B2 | 6/2005 | Salapura et al. | |
| 6,920,501 | B2 | 7/2005 | Chu et al. | |
| 6,922,557 | B2 * | 7/2005 | Fantaske | 455/403 |
| 6,981,140 | B1 * | 12/2005 | Choo | 713/164 |
| 6,990,662 | B2 * | 1/2006 | Messer et al. | 717/174 |
| 7,020,713 | B1 | 3/2006 | Shah et al. | |
| 7,065,568 | B2 * | 6/2006 | Bracewell et al. | 709/223 |
| 7,127,717 | B2 * | 10/2006 | Kawashimo et al. | 718/105 |
| 7,287,090 | B1 | 10/2007 | Berg | |
| 7,287,258 | B1 | 10/2007 | Salmon et al. | |
| 7,290,039 | B1 * | 10/2007 | Lisitsa et al. | 709/217 |
| 7,349,953 | B2 * | 3/2008 | Lisitsa et al. | 709/217 |
| 7,353,266 | B2 * | 4/2008 | Bracewell et al. | 709/223 |
| 7,373,646 | B1 * | 5/2008 | Smith | 718/108 |

(Continued)

OTHER PUBLICATIONS

TechTarget, "OSI (Open System Interconnection)", © Oct. 10, 2006 http://searchnetworking.techtarget.com/definition/OSI.*

(Continued)

*Primary Examiner* — Aimee Li
(74) *Attorney, Agent, or Firm* — Cesari and McKenna, LLP

(57) ABSTRACT

According to a novel mechanism, each processing device (e.g., a central processing unit (CPU) in a multi-processor system) is assigned to process a single execution thread for a task and the execution thread is processed across various layers of the multi-processor system (such as a network layer and application layer) without being divided into separate threads. Advantageously, upon initialization of the multi-processor system, network context data structures are created equal to the number of processing devices in the system. As used herein, a network context is a logical entity to which zero or more connections are bound during their lifetime. Rather than sharing data structures among execution threads, a multi-processor system allocates memory resources per each network context during initialization of the system. As a result, an execution thread processing a task queued to a particular network context accesses memory resources allocated for that network context only.

18 Claims, 9 Drawing Sheets

(56) References Cited

U.S. PATENT DOCUMENTS

| | | | |
|---|---|---|---|
| 7,443,836 B2 | 10/2008 | Hopper et al. | |
| 7,500,239 B2 | 3/2009 | Meng | |
| 7,502,870 B1* | 3/2009 | Chu | 709/250 |
| 7,529,823 B2* | 5/2009 | Trufinescu et al. | 709/223 |
| 7,581,163 B1* | 8/2009 | Zhou et al. | 714/805 |
| 7,630,402 B2* | 12/2009 | Un et al. | 370/469 |
| 7,664,823 B1 | 2/2010 | Wakerley | |
| 7,664,938 B1 | 2/2010 | Tripathi et al. | |
| 7,899,044 B2* | 3/2011 | Rusmisel et al. | 370/389 |
| 7,953,878 B1 | 5/2011 | Trimble | |
| 8,135,033 B2* | 3/2012 | Garcia et al. | 370/469 |
| 2002/0194338 A1 | 12/2002 | Elving | |
| 2003/0069920 A1 | 4/2003 | Melvin et al. | |
| 2003/0081615 A1 | 5/2003 | Kohn et al. | |
| 2003/0140088 A1* | 7/2003 | Robinson et al. | 709/202 |
| 2004/0030745 A1 | 2/2004 | Boucher et al. | |
| 2004/0148376 A1 | 7/2004 | Rangan et al. | |
| 2004/0193678 A1* | 9/2004 | Trufinescu et al. | 709/203 |
| 2004/0205754 A1 | 10/2004 | Gazda et al. | |
| 2004/0216125 A1 | 10/2004 | Gazda et al. | |
| 2004/0246956 A1* | 12/2004 | Meng | 370/389 |
| 2005/0060365 A1* | 3/2005 | Robinson et al. | 709/203 |
| 2005/0138091 A1 | 6/2005 | Bono | |
| 2005/0154783 A1* | 7/2005 | Lisitsa et al. | 709/209 |
| 2005/0226235 A1 | 10/2005 | Kumar et al. | |
| 2005/0243734 A1 | 11/2005 | Nemirovsky et al. | |
| 2006/0013222 A1 | 1/2006 | Rangan et al. | |
| 2006/0013253 A1 | 1/2006 | Hufferd | |
| 2006/0059287 A1* | 3/2006 | Rivard et al. | 710/300 |
| 2006/0242532 A1 | 10/2006 | Joglekar et al. | |
| 2006/0271734 A1 | 11/2006 | Strange et al. | |
| 2007/0019636 A1 | 1/2007 | Lau et al. | |
| 2007/0026887 A1* | 2/2007 | Voyer et al. | 455/525 |
| 2007/0070975 A1 | 3/2007 | Otani et al. | |
| 2007/0078819 A1 | 4/2007 | Zayas et al. | |
| 2007/0162631 A1 | 7/2007 | Balakrishnan et al. | |
| 2007/0168693 A1 | 7/2007 | Pittman | |
| 2007/0174850 A1 | 7/2007 | El Zur | |
| 2007/0208821 A1 | 9/2007 | Pittman | |
| 2007/0291779 A1* | 12/2007 | Wunderlich | 370/411 |
| 2008/0082966 A1 | 4/2008 | Dorn et al. | |
| 2008/0114814 A1* | 5/2008 | Vellanki et al. | 707/200 |
| 2008/0134196 A1 | 6/2008 | Madriles et al. | |
| 2008/0163215 A1 | 7/2008 | Jiang et al. | |
| 2008/0184233 A1 | 7/2008 | Norton et al. | |
| 2008/0244118 A1 | 10/2008 | Accapadi et al. | |
| 2008/0301299 A1* | 12/2008 | Cahill et al. | 709/226 |
| 2009/0006502 A1 | 1/2009 | Leung et al. | |
| 2009/0125907 A1 | 5/2009 | Wen et al. | |

OTHER PUBLICATIONS

Wikipedia, "OSI model", © Dec. 23, 2004 http://en.wikipedia.org/w/index.php?title=OSI_model&oldid=9028529.*

Millberg, Mikael; Nillson, Erland; Thid Rikard; Kumar, Shashi; Jantsch, Axel, "The Nostrum Backbone—a Communication Protocol Stack for Networks on Chip", © 2004, IEEE, Proceedings of the 17$^{th}$ Internation Conference on VLSI Design.*

Lin, Xiaojun; Shroff, Ness B.; Srikant, R., "A Tutorial on Cross-Layer Optimization in Wireless Networks", © 2006, IEEE, IEEE Journal on Selected Areas in Communications, vol. 24, No. 8, pp. 1452-1463.*

Biswas, Anumita. "Application-Controlled Network Packet Classification", U.S. Appl. No. 11/936,141, filed Nov. 7, 2007, 52 pages.

Ito, Robert Mabo et al., "A Multiprocessor Approach for Meeting the Processing Requirements for OSI," IEEE Journal on Selected Areas in Communications, vol. 11, No. 2, Feb. 1993.

Kaiserwerth, Matthias, "The Parallel Protocol Engine," IEEE/ACM Transactions on Networking, vol. 1, No. 6, Dec. 1993.

Nahum, Erich M et al., "Performance Issues in Parallelized Network Protocols," Proceedings of the First Symposium on Operating Systems Design and Implementation, Usenix Association, Nov. 1994.

Schmidt, Douglas C. et al., "Measuring the Performance of Parallel Message-based Process Architectures," INFOCOM '95: Proceedings of the Fourteenth Annual Joint Conference of the IEEE Computer and Communication Societies (vol. 2), Apr. 1995.

Leue, Stephan et al., "On Parallelizing and Optimizing the Implementation of Communication Protocols," IEEE/ACM Transactions on Networking, vol. 4, No. 1, Feb. 1996.

Yates, David J. et al., "Networking Support for Large Scale Multiprocessor Servers," Proceedings of the 1996 ACM SIGMETRICS international conference on Measurement and modeling of computer systems, May 1996.

Salehi, James D. et al., "The Effectiveness of Affinity-Based Scheduling in Multiprocessor Network Protocol Processing (Extended Version)," IEEE/ACM Transactions on Networking, vol. 4, No. 4, Aug. 1996.

Bjorkman, Mats et al, "Performance Modeling of Multiprocessor Implementations of Protocols," IEEE/ACM Transactions on Networking, vol. 6, No. 3, Jun. 1998.

* cited by examiner

COMBINED NETWORK AND APPLICATION PROCESSING IN A MULTIPROCESSING ENVIRONMENT

RELATED PATENT APPLICATIONS

This application is related to U.S. patent application Ser. No. 11/936,141, entitled "APPLICATION-CONTROLLED NETWORK PACKET CLASSIFICATION," by Anumita Biswas, filed on Nov. 7, 2007.

FIELD OF THE INVENTION

The present invention relates to transmission of data packets across a network, and more particularly, to parallelizing processing of data packets in a multi-processor system.

BACKGROUND

It is known to parallelize processing of data packets so that more than one data packet can be executed at the same time in a multi-processor system. Multi-processor is useful when a single task takes long to complete and processing data packets serially (e.g., one at a time) would slow down the overall data packet throughput. A data packet is a unit of data transmitted as a discrete entity between devices over a network.

Some multi-processor systems follow the ISO/OSI (International Standards Organization/Open System Interconnection) model, which defines a networking framework for implementing protocols in seven layers. These layers are an application layer, a presentation layer, a session layer, a transport layer, a network layer, a data link layer, and a physical layer. These layers will be described in greater detail in reference to FIG. 2. In such a system, control is passed from one layer to the next during execution of a data packet.

Increasing overall system performance is a goal that most multi-processor systems aim to achieve. Existing multi-processor systems usually parallelize processing of data packets in a network layer of the multi-processor system and divide the data packet processing between a network layer and an application layer. The network and transport layers provide identifiers, known as internet protocol (IP) addresses and ports that uniquely identify an endpoint of a two way communication in what is termed as a connection. The network layer also determines the route from the source device (e.g., a device that sends a request) to the destination device (a device that receives the request). The transport layer performs data flow control and provides recovery mechanisms from packet loss during network transmission. The application layer is the layer at which applications utilize network services in the layers below it to do various user driven functions like file transfer, database transactions and the like. Typically, first, a network layer processes inbound data packets and after processing them signals an application thread (which runs in the application layer) to continue the processing. A thread is a separate stream of packet execution. An application thread at some point picks up the packet and performs processing in a separate application thread. Thus, dividing processing of data packets between the two layers presents scheduling delays and impacts overall system's performance.

Moreover, conventionally, an application layer would execute application threads to process data packets arriving from the network layer. Once the network layer processes a data packet on one processor, it then hands off a data packet to the application layer, which runs separate application threads on another processor. Even though the processors are capable of operating independently, still the processor executing the application thread may need to wait for the results of the execution of the network thread on another processor. As a result, at least two processors were required to process a data packet from a network layer up to the application layer.

Furthermore, when one or more application threads are executed in parallel in a multi-processor system, they often need to access common resources (such as data structures). If more than one thread tries to access the same resource to process a data packet, a lock is needed to prevent two threads from accessing the same resource(s). Implementing locks, however, can be burdensome and expensive and can slow down performance of the system.

Accordingly, what is needed is a mechanism that can increase overall system's performance by eliminating shortcomings of dividing data packet processing between network processing and application processing without locking requisite resources.

SUMMARY OF THE INVENTION

According to a novel mechanism, each processing device (e.g., a central processing unit (CPU) in a multi-processor system) is assigned to process an execution thread for a task across various layers of the multi-processor system (such as across a network layer and application layer) so that execution of a single thread is not divided between a network layer and an application layer. Since a single processing device can perform processing across the layers, the need to move a thread from one processing device to another can be eliminated. This in turn, allows other processing devices in the multi-processor system to be efficiently used to execute more threads. As a result, throughput of a multi-processor system increases.

Advantageously, upon initialization of the multi-processor system, network context data structures are created equal to the number of processing devices in the system. As used herein, a network context is a logical entity to which zero or more connections are bound during their lifetime. Rather than sharing data structures among execution threads, a multi-processor system allocates memory resources per each network context during initialization of the system. As a result, an execution thread processing a task queued to a particular network context accesses memory resources allocated for that network context only. Since each execution thread can access a pool of resources assigned to a corresponding network context, the need to lock various memory resources, which are typically accessed by more than one thread, can be eliminated. As a result, more than one execution threads running across various layers of the system can be executed in the multi-processor system.

Furthermore, as discussed herein, each network context is associated with its own pool of resources (e.g., application data structures and memory sub-regions for storing thread messages) which are not accessed by any other execution thread. For example, a memory of the multi-processor system can be segmented into a plurality of memory sub-regions, with each sub-region storing data structures for each network context. Thus, for 'n' network contexts, there are 'n' memory sub-regions corresponding to each network context. Each execution thread can use its own memory sub-region to pass messages without clashing with another execution thread. As a result, more than one execution thread can be processed simultaneously in the multi-processor system without requiring burdensome and expensive process of locking data structures and memory. Furthermore, combining network and application threads into a single execution thread provides performance benefits as it avoids delays associated with queuing data packets between the network layer and the application layer.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Network and Storage Server Environment

Figure 1:
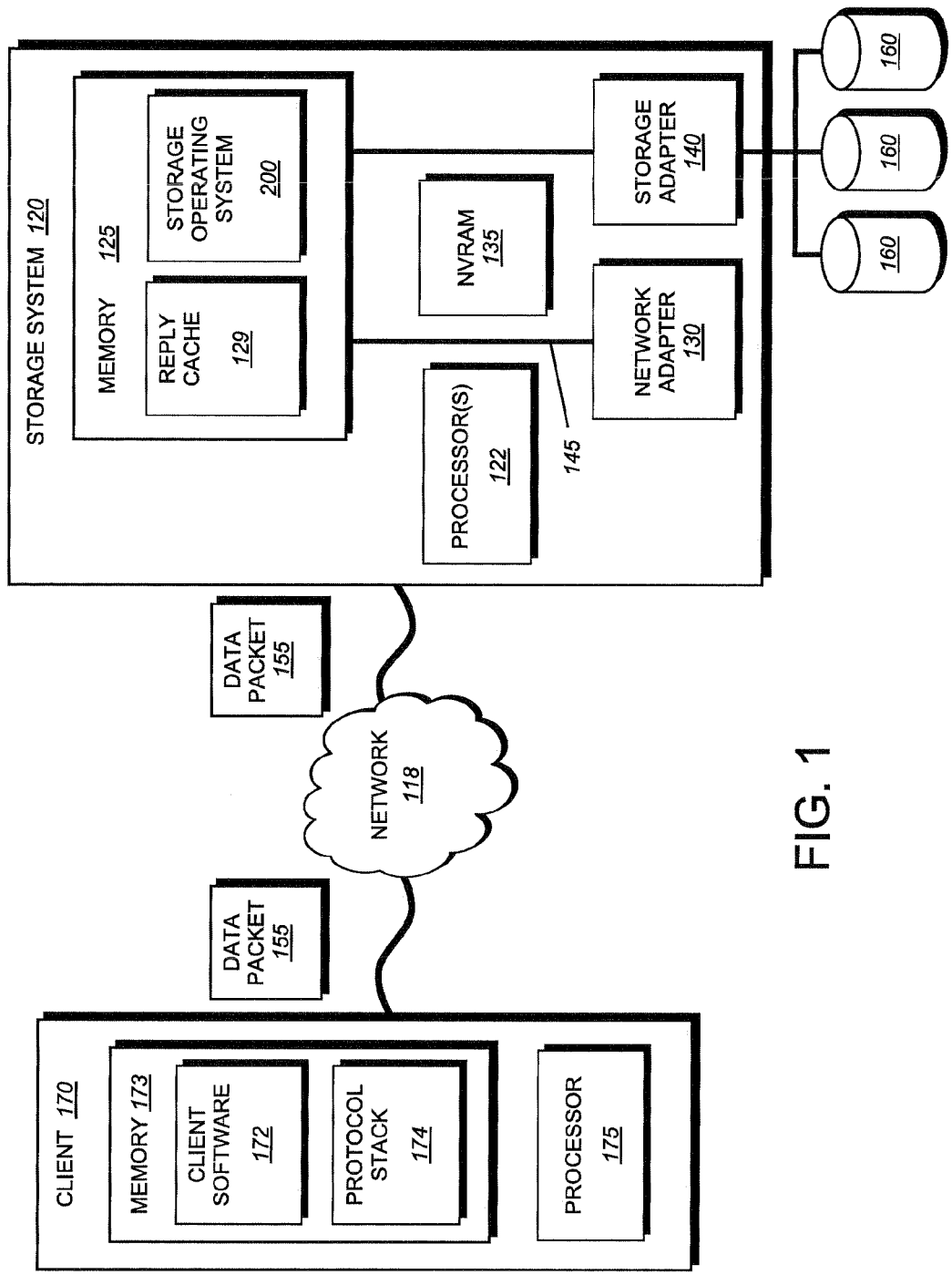
FIG. 1 shows network environment that includes a source network device and a destination network device that communicate with each other over a network according to an embodiment of the present invention.

FIG. 1 is a schematic block diagram of a storage system environment that includes two interconnected network devices, such as a source network device (e.g., client 170) and a destination network device (e.g., storage system 120) communicating with each other by exchanging data packets over a network 118, such as a local or wide area network. Although one client 170 is shown in FIG. 1, those skilled in the art would understand that any number of clients can communicate with storage system 120 over network 118. Furthermore, a source network device can be a storage system in communication with destination storage system 120. As used herein, the term "source" can be broadly defined as a location from which data travels, and the term "destination" can be defined as the location to which the data travels.

The client 170 transmits requests for data to the destination storage system 120 and receives responses to the requests over network 118. Data is transferred between the client 170 and the storage system 120 using data packets 155. If the client 170 executes the Windows® operating system (not shown in FIG. 1), data packets can be transmitted using the Common Internet File System (CIFS) protocol over TCP/IP. Client 170 can run the UNIX® operating system. In such an embodiment, client 170 may communicate with the storage system 120 using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that client systems running other types of operating systems may also communicate with the storage system using other file access protocols. Furthermore, client 170 may communicate with destination storage system 120 using block-based protocols, such as Internet Small Computer System Interface (iSCSI) or Fibre Channel (FC) protocol.

As shown in FIG. 1, client 170 executes client software 172 (such as CIFS client software, NFS client software, DAFS client software, or any other application resident in memory 173 and executed by processor 175 on a client 170). Client 170 further includes a protocol stack 174, which may include TCP/IP protocol stack (Internet Protocol module and its supporting transport mechanisms, the Transport Control Protocol module and the User Datagram Protocol module). These modules are not shown in FIG. 1.

Destination storage system 120 can be a multiprocessing network device that manages storage of one or more volumes, which in turn, may comprise an array of storage devices 160. Storage system 120 comprises a plurality of processors 122 (also referred to herein as "processing device"), a memory 125, a network adapter 130, and a storage adapter 140 interconnected by a system bus 145. These components of the storage system 120 are briefly described below.

Processors 122 can be any machine, which are capable of executing a sequence of instructions (e.g., macro- or microinstructions). Processors 122 may be implemented as general purpose microprocessors or special purpose microprocessors. As will be described in greater detail herein, each processor is assigned to process an execution thread for a task and processes the execution thread across various layers of the multi-processor system (such as across a network layer and application layer). Unlike prior art implementations, which required at least one processor to execute a task in the network layer and another processor to execute the same task in the application layer, according to novel embodiments, a single processor is assigned to execute a single execution thread across various layers. As a result, other processors in the multi-processor system 120 can be efficiently used to execute more threads. This, in turn, increases throughput of the multi-processor system 120.

In the illustrative embodiment, the memory 125 comprises storage locations that are addressable by the processors and adapters for storing software program code. The memory 125 can be a random access memory (RAM). The processors and adapters may, in turn, comprise processing elements and/or logic circuitry configured to execute the software code and manipulate the data structures stored in memory. The operating system 200 (shown in more detail in FIG. 2), portions of which are typically resident in memory, functionally organizes the storage system by, inter alia, invoking storage operations in support of a file service or block service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect storage system 120 to the network 118, which may comprise a point-to-point connection or a shared medium, such as a local area network.

The storage adapter 140 cooperates with the operating system 200 executing on the storage system to access data requested by the client system (such as client 170). The data may be stored on storage devices 160 that are attached, via the storage adapter 140, for example, to storage system 120.

In one exemplary implementation, storage system 120 can include a nonvolatile random access memory (NVRAM) 135 that provides fault-tolerant backup of data, enabling the integrity of storage system transactions to survive a service interruption based upon a power failure, or other fault.

As will be described in more detail with reference to FIG. 2, storage operating system 200 includes a file system 210, application layer 220 (which may include HTTP server 222, NFS server 224, CIFS server 226, SnapMirror application 228, etc), and a network layer 270 (these components are shown and described in greater detail in reference to FIG. 2).

Storage Operating System

Figure 2:
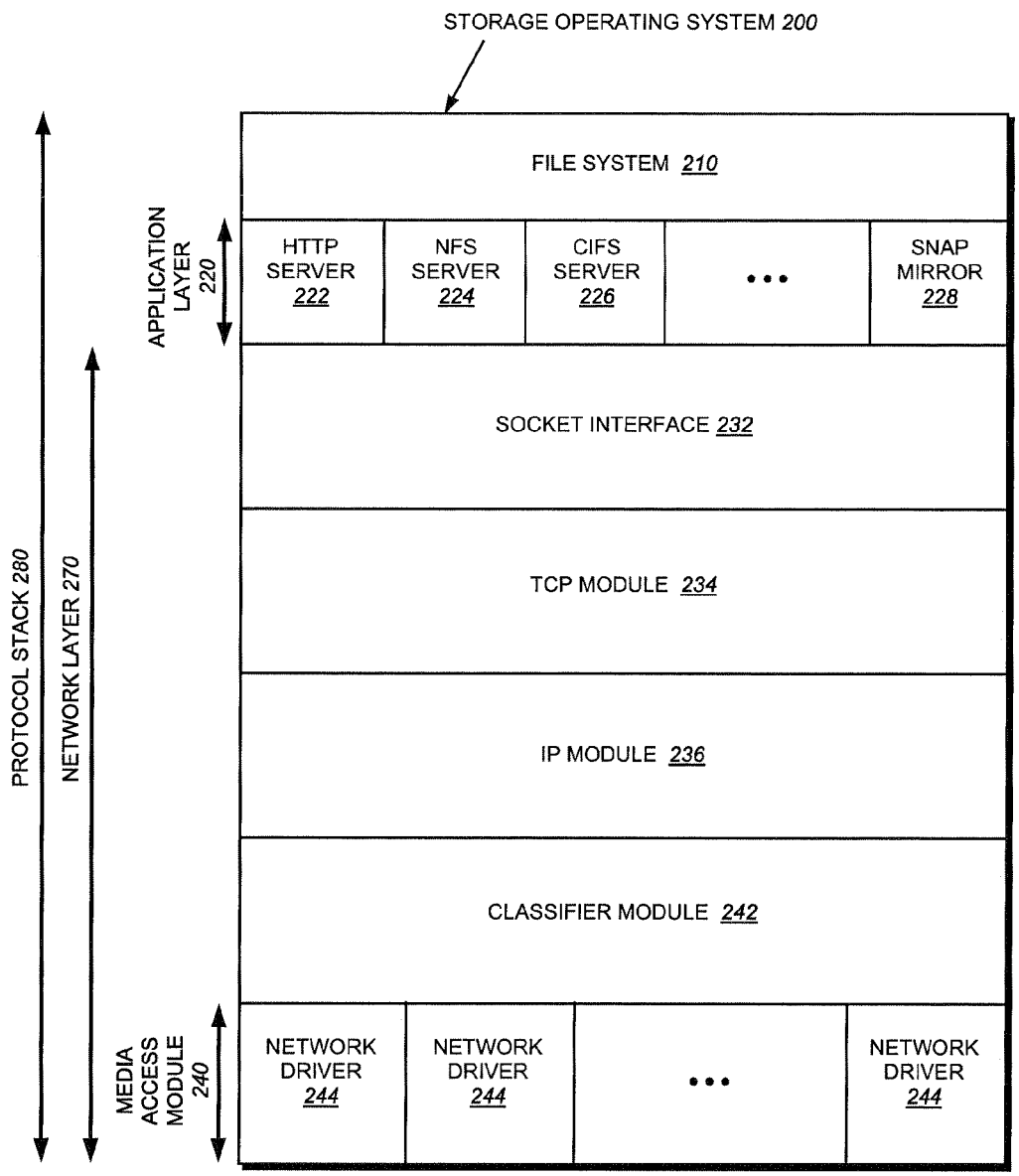
FIG. 2 is a block diagram of components of an operating system of the destination network device shown in FIG. 1.

FIG. 2 is a schematic block diagram of the components of the storage operating system 200 of storage system 120 that may be advantageously used with embodiments of the present invention. In the illustrative embodiment, the storage operating system 200 can be the Data ONTAP™ operating system available from Network Appliance Inc., of Sunnyvale, Calif., that implements a Write Anywhere File Layout (WAFL™) file system, such as file system 210. Those skilled in the art would understand that a file system other than WAFL™ can be used to implement a novel mechanism described herein. As used herein, the term "storage operating system" generally refers to the computer-executable code operable on a computer that manages data access. The storage operating system 200 can be implemented as an application program operating over a general-purpose operating system, such as UNIX® or Windows NT®, or as a general-purpose operating system, which is configured for storage applications as described herein. The storage operating system 200 further includes a disk management module (not shown in FIG. 2) that manages disk access operations. The disk management module may include a disk storage module that implements a disk storage protocol and a disk driver module that implements a disk access protocol (these modules are not shown in FIG. 2).

Still referring to FIG. 2, the storage operating system 200 includes a series of modules organized to form an integrated protocol stack 280 or, more generally, a multi-protocol engine that provides data paths for clients (e.g., client 170) or other storage systems to access data stored on the storage system 120 using block and/or file access protocols. In one implementation, the protocol stack 280 can follow the OSI model that defines a network framework for implementing protocols in seven layers so that control is passed from one layer to the next, starting from the top layer (e.g., application layer 220) and proceeding to the bottom layer (e.g., the physical layer, which corresponds to the media access module 240 shown in FIG. 2). The media access module 240 comprises network drivers 244 (e.g., gigabit Ethernet drivers). The media access module 240 as a physical layer is responsible for transmitting bits of data from one network device to another network device and regulates the transmission of a stream of bits over a physical medium. For example, media access module 240 defines how a cable is attached to the network adapter (such as network adapter 130 shown in FIG. 1) and what transmission technique is used to transfer the data over the cable.

The media access module 240 interfaces to the classifier module 242 (corresponding to the data link layer in the OSI model). The classifier module 242 is responsible for maintaining a pool of network threads and their associated queues (referred to herein as network contexts and shown in more detail in FIG. 3). A network thread is a process that executes network functionality. A network context includes work items to be processed. A work item generally includes data packets to be processed and a function pointer that needs to be executed with the packets.

The IP module 236 (corresponding to the network layer in the OSI model) is responsible for translating logical addresses into physical addresses. A logical address refers to a network layer address, such as an IP address. A physical address refers to an address of the physical communications device in a system. The IP module 236 is further responsible for managing flow control problems, such as switching and routing. As known in the art, the IP module 236 may be used to implement the Internet Protocol for routing data packets to their intended destinations over a network. TCP module 234 corresponds to the transport layer in the OSI model. TCP module 234 handles error recognition and recovery. It also repackages long messages, when necessary, into small packets for transmission at the receiving end and rebuilds packets into the original message. The TCP module 234 may implement the Transport Control Protocol for ensuring reliable transport of data packets over a network.

The socket interface 232 corresponds to the session layer in the OSI model. Socket interface 232 allows applications on different devices to establish, use and terminate a session/connection. Socket interface 232 regulates which device transmits data, when and how long the transmission takes place. The socket interface 232 can be implemented as Berkeley Software Distribution (BSD) interface.

Media access module 240, classifier module 242, IP module 236, TCP module 234 and socket interface module 232 are part of a network layer 270.

Application layer 220 (which corresponds to application layer in the OSI model) is the layer at which applications access network services. Application layer 220 represents the services that directly support applications, such as software for file transfers, database access, and electronic mail. For example, in one embodiment, application layer 220 may include Hypertext Transfer Protocol (HTTP) server 222 for providing services for file transfer in HTTP format, NFS server 224, CIFS server 226, SnapMirror® application 228, or any other application resident in memory 125 and executed by processors 122 on storage system 120.

Typically, for each layer, the operating system 200 defines one or more processing threads that process data packets and then passes the data packets to the next thread in the next layer for further processing. When processing data packets, the processing threads may pass messages (thread messages) to each other using a message passing scheme provided by the operating system 200. A thread message contains data needed to properly process data packets between the threads. For example, a thread message may include an indication of data location, such as a file offset and a length of data to retrieve. Conventionally, an application layer would execute application threads to process data packets arriving from the network layer. Thus, once the network layer processes a data packet on one processor, it then hands off a data packet to the application layer, which runs separate application threads on another processor. Even though the processors are capable of operating independently, still the processor executing the application thread may need to wait for the results of the execution of the network thread on another processor. As a result, at least two processors were required to process a data packet from a network layer up to the application layer. Splitting processing into two parts thus presents delays in processing of data packets and results in inefficient utilization of processing resources, such as CPUs. Furthermore, an application layer often needs to access various application data structures (such as a reply cache 129) to perform a common task while processing data packets. As a result, multiple application threads had to access common data structures at the same time. To avoid this from happening, a shared data structure was typically locked while accessed by an application thread.

According to a novel mechanism, each processing device (e.g., a central processing unit (CPU) in a multi-processor system) is assigned to process a single execution thread for a task and the execution thread is processed across various layers of the multi-processor system (such as a across a network layer and application layer) without being divided into separate threads. Advantageously, upon initialization of the multi-processor system, network context data structures are created equal to the number of processing devices in the system. As used herein, a network context is a logical entity to which zero or more connections are bound during their lifetime. Rather than sharing data structures among execution threads, a multi-processor system allocates memory resources per each network context during initialization of the system. As a result, an execution thread processing a task queued to a particular network context accesses memory resources allocated for that network context only. Since each execution thread can access a pool of resources assigned to a corresponding network context, the need to lock various memory resources, which are typically accessed by more than one thread, can be eliminated. As a result, more than one execution threads running across various layers of the system can be executed in the multi-processor system.

Furthermore, since conventionally, data packet processing was divided between the network layer and the application layer, at least two CPUs in the multi-processor system were occupied at the same time to process a data packet given that there is interdependency between processing a network thread and an application thread. According to the novel mechanism, since a single execution thread processes a data packet across various layers of the operating system in the same network context, the need to utilize two CPUs to process a thread is eliminated. Rather, a single CPU can be assigned to process the execution thread. As a result, remaining CPUs in the multi-processor system can be utilized to process other threads.

Methods of Operation

Figure 6A:
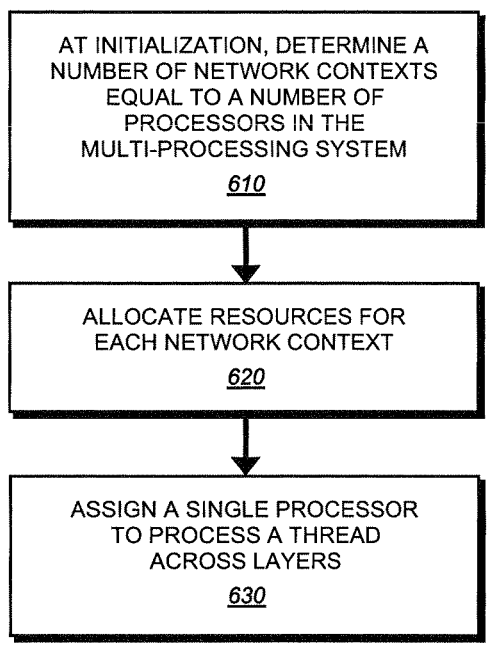
FIG. 6A is a flow diagram of the steps performed by a multi-processor system during initialization according to embodiments of the present invention.
Figure 8:
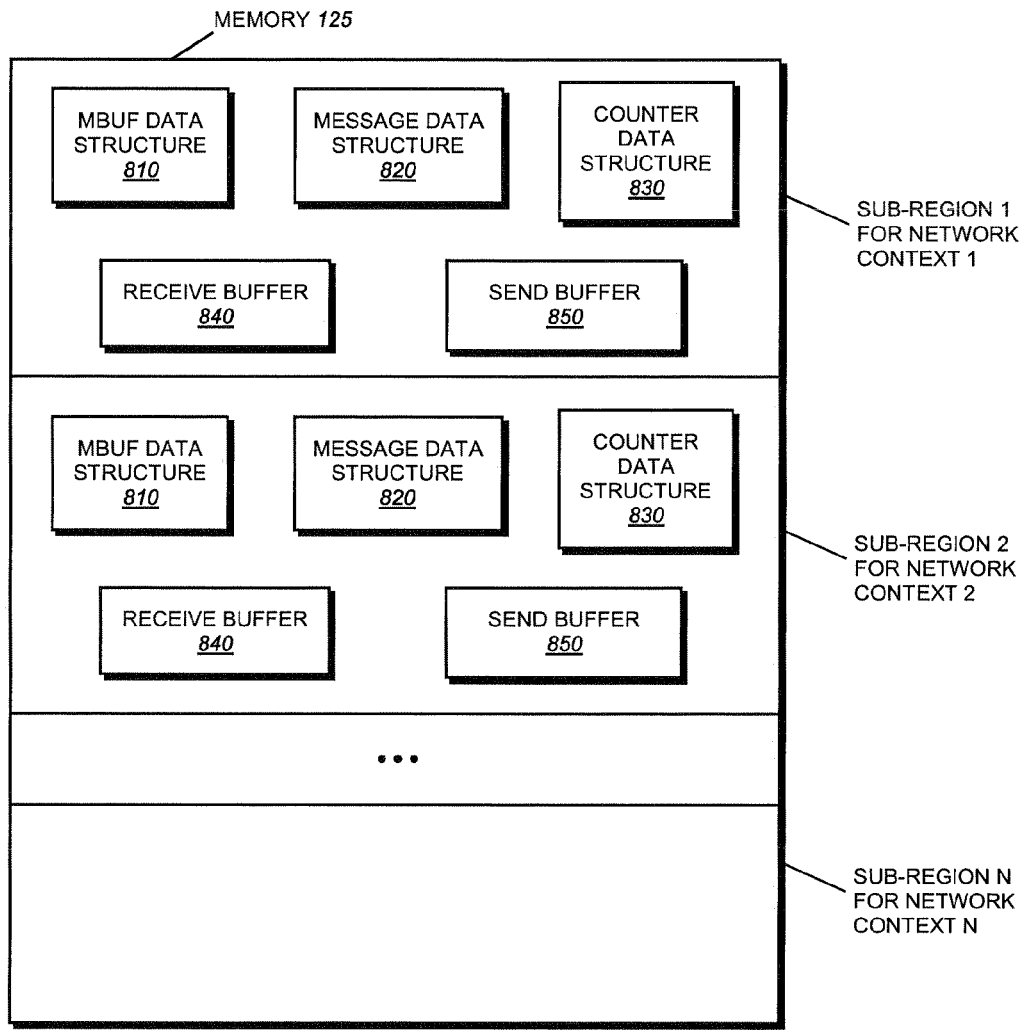
FIG. 8 is a diagram showing memory subdivisions for allocating data structures per each network context in the multi-processor system shown in FIG. 1 according to embodiments of the present invention.

Referring now to FIG. 6A, it illustrates the steps performed by a multi-processor system (such as storage system 120 shown in FIG. 1). During initialization, operating system creates a number of network contexts equal to the number of CPUs in the system (step 610). The number of network contexts is then used by the storage system 120 to allocate memory resources for each network context (step 620). For example, referring now to FIG. 8, memory 125 (at the storage system 120) is segmented into a plurality of memory sub-regions so that each sub-region can store data structures for a particular network context (e.g., mbuf data structure 810 for holding data packet data; a message data structure 820 for communicating with a file system; a counter data structure 830 that indicates a number of processed read and write requests for each network contexts; a receive buffer 840; and a send buffer 850, as well as other data structures). As shown in FIG. 8, each memory sub-region has data structures corresponding to a particular network context. Thus, for 'n' network contexts, there are 'n' memory regions, each memory region corresponding to each network context. Since no two threads can access the same data structures, two or more threads can be executed at the same time, with each thread executing a data packet across network and application layer, without clashing for the same resource (e.g., data structures).

Still with reference to FIG. 6A, as part of the initialization of the multi-processor system, a single CPU is assigned to process an execution thread across layers of the operating system (step 630).

Figure 6B:
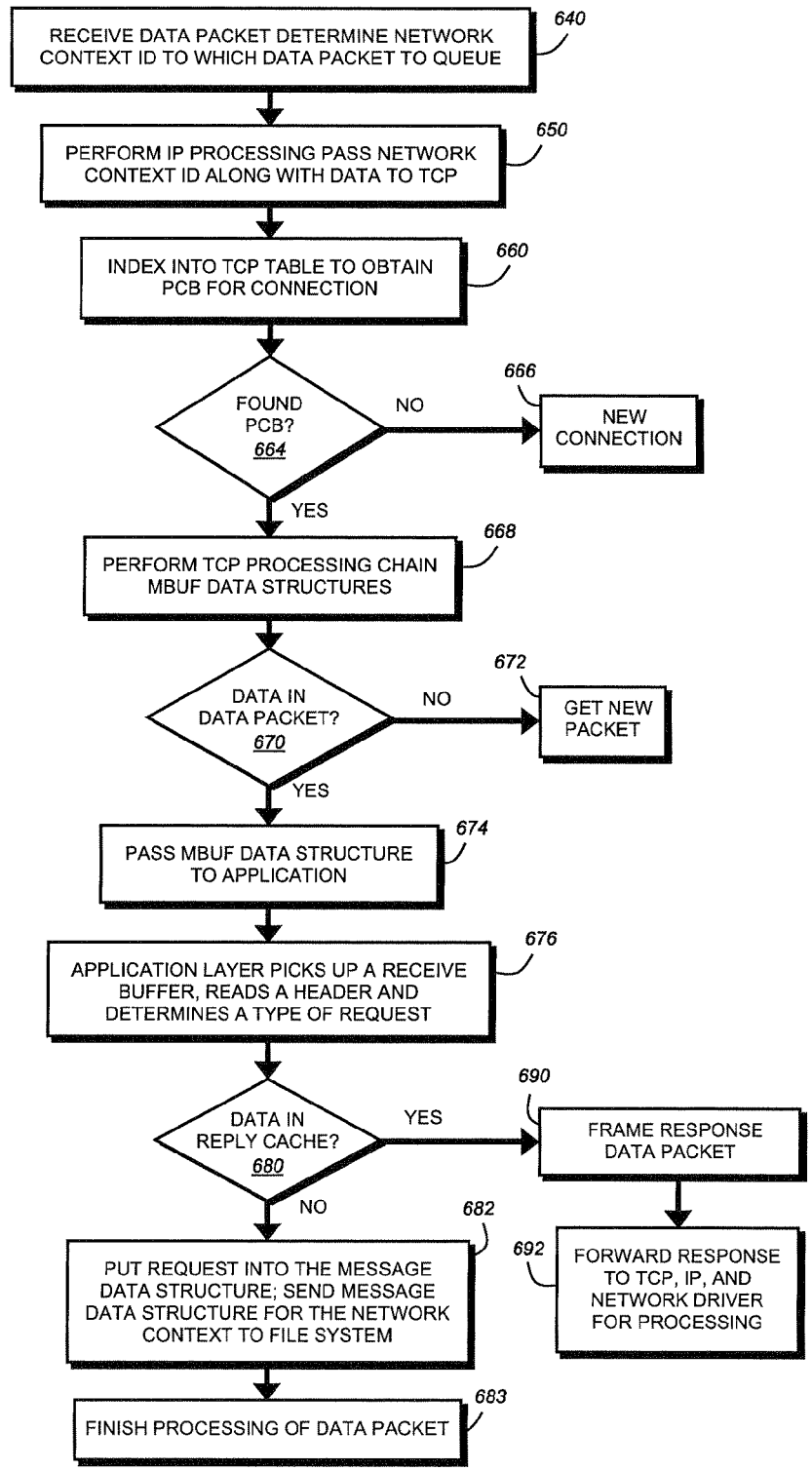
FIG. 6B is a flow diagram of the steps performed by a multi-processor system to process a data packet as a single execution thread across layers of an operating system according to embodiments of the present invention.

Referring now to FIG. 6B, it illustrates steps performed by storage system 120, implemented as a multi-processor system, to process data packets across layers (e.g., a network layer and an application layer) of an operating system according to an embodiment of the present invention.

Storage system 120 receives a request to establish a network connection from a client system 170. Such a request may include a source IP address, a source port and a destination port. As discussed herein, the TCP module 234 may be used to implement the Transport Control Protocol for ensuring reliable transport of data packets over a network. The TCP module 234 may provide a plurality of TCP ports, each port being identified by a port number and capable of establishing a TCP connection over the network. Thus, each TCP connection may be identified by a source IP address, source port number, a destination IP address, and a destination port number. A destination network device (such as storage system 120) may allocate a temporary port number for a source network device that establishes connection with a destination storage device to use in creating a TCP connection. A TCP connection is typically received through a well-known port number at the destination network device. Each network service has a well-known TCP port number defined by the network service standards and may "listen" on that port for incoming connections. Multiple connections may use the same TCP port number if they are connecting to the same network service.

Each network driver device 244 may maintain multiple connections through the network through multiple physical ports. Each port (a physical socket with supporting circuitry) maintains a specific connection. Each port of a network driver device 244 may operate as a separate device having a media access control (MAC) address and its own assigned IP address (so that a connection to the IP address will always be handled by that physical port of the network device). Each port can handle multiple TCP/IP connections.

Thus, initially, a request to establish connection is received by network drivers of storage system 120. A request is in the form of a data packet. The network drivers call the classifier module 242, which is responsible for identifying a network context to which the data packet will be queued (step 640). To this end, in one implementation, classifier module 242 calculates a value based on a 3-tuple (source IP address, source port, and destination port) indicated in the packet. The following hash function can be used to determine a network context:

$$\text{Destination port } 1{:}y=\text{hash}1(x);$$

wherein 'x' is a logical combination of a source IP address of the incoming data packet, a source port, and a destination port (also referred to herein as a 3-tuple); 'y' represents a hash number, which then becomes an input to another function that maps the hash to a network context number 'y1' as follows: y1=map_hash_q(y); wherein "q" represents a network context queue. Those skilled in the art would understand that other mechanisms can be used to compute a logical value based on a 3-tuple.

At step 650, IP processing of the data packet is performed by IP module 236. IP module 236 validates the data packet and sends it off to the TCP module 234 along with the network context identification (ID) to which the data packet is queued.

The TCP module 234 receives the data packet and the network context identifier (ID) and determines how to process the data packet (step 660). To this end, TCP module 234 then uses a 3-tuple as an index to a TCP connection table (such as the one shown in FIG. 7) corresponding to the received network context (step 660). At this point, it is advantageous to describe differences between TCP connection tables according to prior art implementations and a novel mechanism by which each network context is associated with its own TCP connection table.

Figure 5:
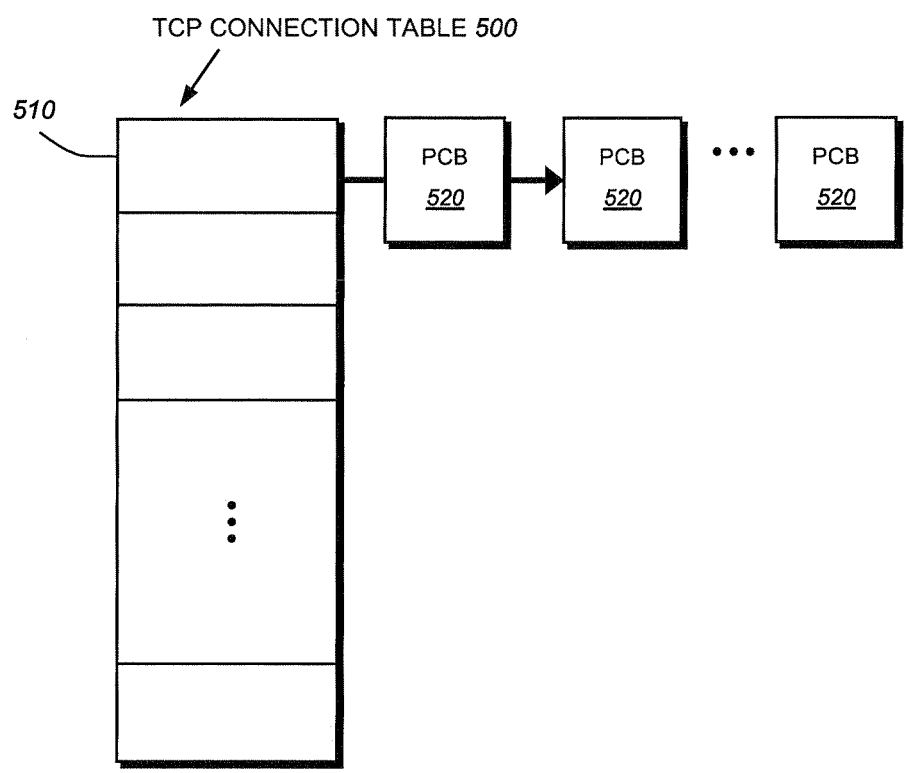
FIG. 5 is a diagram of an exemplary network data structure used to process data packets on a connection.

Referring now to FIG. 5, it illustrates TCP connection table 500 (according to a prior art implementation), which represents an array, with each index 510 in the array being a linked list of PCBs 520. An index is also referred to herein as a "hash bucket." Each PCB stores data related to one TCP connection. Such data may relate to establishing a connection, managing data transmission via data packets, managing data receipt, and termination of the connection. TCP connection table 500 is accessed by more than one thread to access PCB to obtain information about a particular connection. As a result, locks are typically implemented to prevent more than one thread from accessing the same PCB.

Figure 7:
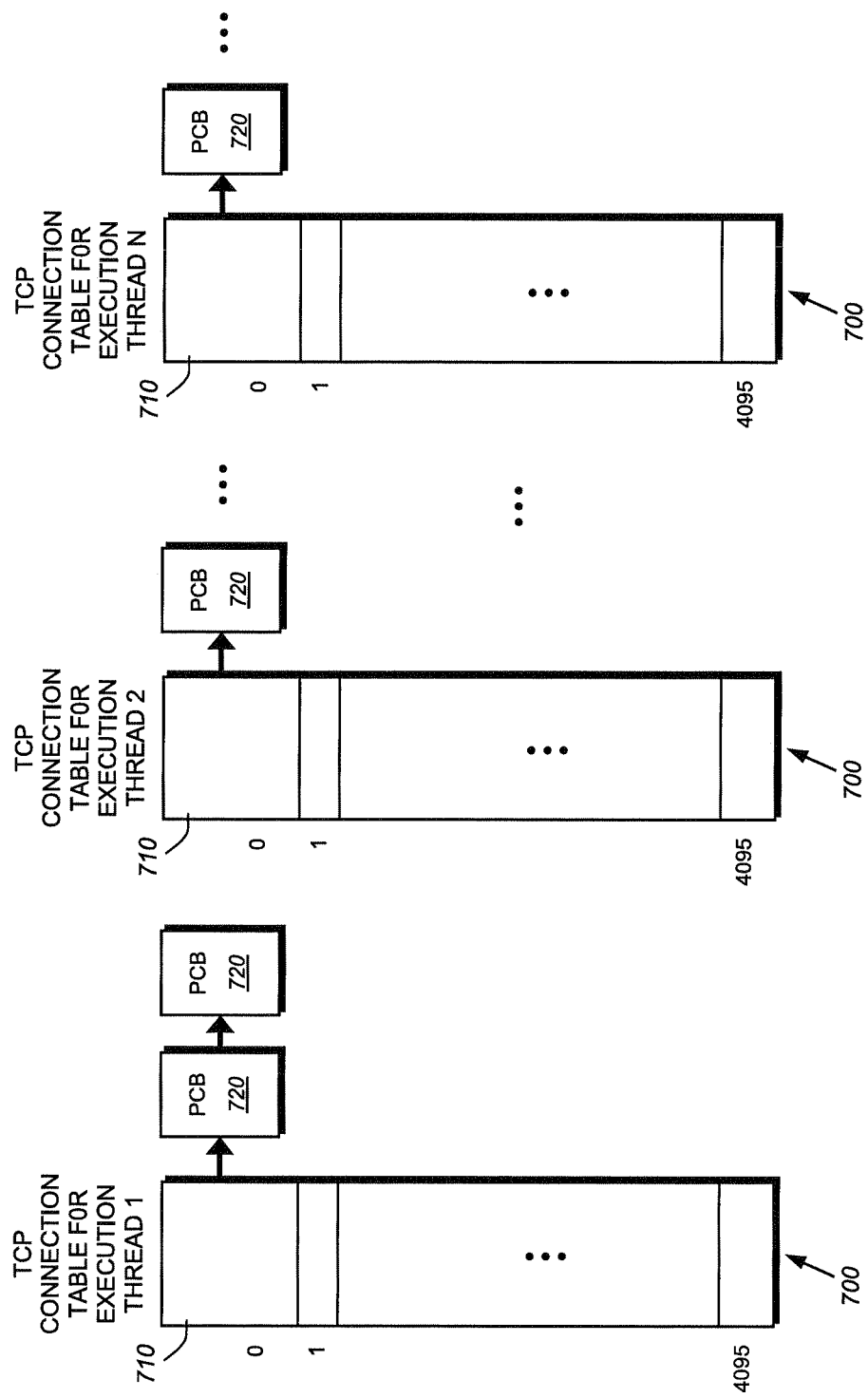
FIG. 7 is a diagram showing a plurality of network data structures, each data structure associated with a network context according to an embodiment of the present invention.

According to a novel technique, which is described in a commonly-owned patent application U.S. patent application Ser. No. 11/936,141, entitled "APPLICATION-CONTROLLED NETWORK PACKET CLASSIFICATION," by Anumita Biswas, the disclosure of which is incorporated by referenced herein, rather than having one TCP data structure that is accessed by all threads (such as shown in FIG. 5), each network context is associated with its own TCP data structure that stores a linked list of PCBs for connections queued to that network context. Thus, FIG. 7 illustrates a plurality of TCP tables 700. Each TCP table 700 is associated with one network context (which, in turn, is served by an execution thread that processes data packets queued to that network context). TCP table 700 includes an array of hash buckets 710, with each hash bucket 710 being linked to a list of PCBs 720. TCP table 700 is established upon initialization of storage system 120 and can be maintained in memory 125.

Thus, to determine how to process a data packet received on a connection, TCP module 234 indexes into a TCP table corresponding to the received network context ID. An index to access the TCP table can be computed as a value based on a 3-tuple (a source IP address, a source port, and a destination port indicated in an initial data packet to establish the connection). TCP module 234 compares the computed value with data in PCBs (step 664). If there is a match (e.g., the PCB block for the requested connection already exists), TCP module 234 uses the data stored in the PCB to process data packets arriving on the connection (step 668). In addition, the TCP module 234 puts the data packet on a socket indicated in the PCB (e.g., queues the data packet in memory 125 and chains mbuf data structures in memory). As noted herein, mbuf data structures are allocated for each network context and are used for holding data packet data during data packet processing.

If, at step 664, PCB is not found in the TCP table, it may indicate that a connection is a new one. TCP module treats it as a new connection (step 666). To this end, TCP module 234 creates a new PCB and attaches it to a linked list of PCBs in the TCP table corresponding to the context ID. The new PCB block includes data for the initiated connection (such as data related to a) establishing a connection, b) managing data transmission, c) managing data receipt, and d) termination of connection)).

After TCP processing at step 668, a determination is made whether there are data in a data packet (step 670). If there are data (such as a header and a payload), the mbuf data structure is passed to application layer (step 674). Mbuf data structure includes, for example, a network context ID, a receive buffer, and a send buffer.

Application layer 220 receives the receive buffer and reads a header of the data packet to determine the type of a request (e.g., read, write, etc) (step 676)

Figure 4:
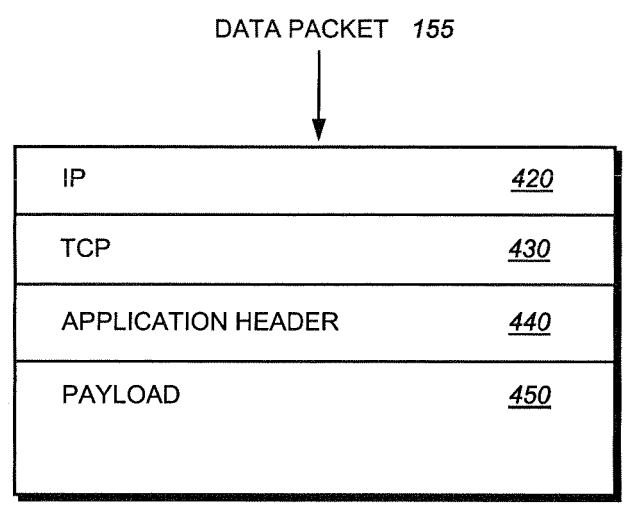
FIG. 4 is a block diagram of various fields of a data packet transmitted between a source network device and a destination network device shown in FIG. 1.

An exemplary data packet 155 transmitted between client 170 and storage system 120 is shown in FIG. 4. Data packet 155 includes various fields, such as IP header 420, TCP header 430, application header 440, and payload 450.

IP header 420, in turn, includes fields for storing a source IP address (also referred to herein as a "foreign IP address") and a destination IP address (also referred to herein as "a local IP address").

TCP header 430 includes fields for storing a source port (also referred to herein as a "foreign port") and a destination port (also referred to herein as a "local port").

Application header 440 includes control data provided by an application when processing a data packet. If the client 170 executes, for example, CIFS client software, the application header 440 stores control data related to CIFS protocol. Similarly, in the case of NFS software, the header stores control data related to NFS protocol. If the application is a replication application (such as SnapMirror) executed at the source network device and a destination network device, the application header includes control data inserted by the replication application. Payload 450 includes actual data to be stored at the destination storage system 120.

Still with reference to FIG. 6B, application layer 220 determines (step 680) (e.g., for a read request) whether requested data are in a reply cache (such as the one shown in FIG. 1). A reply cache is used to cache replies to non-idempotent requests, so that in case of retransmission of a client request, the correct reply can be sent back to the client. Non-idempotent requests refer to operations that do not return same results if repeated (e.g., remove, create, etc).

As described herein, each reply cache is associated with a network context. Thus, application layer 220 determines whether the requested data are in the reply cache associated with the network context in which the data packet is executed. If the data are in the reply cache, the execution thread receives the data, frames a response data packet (step 690) and puts the response into the mbuf data structure allocated to the network context to which the data packet was originally queued. As part of framing a response data packet, the execution thread populates the data packet with a protocol header (such as NFS header, CIFS header, etc). The execution thread returns a memory address(s) for the mbuf data structure to the sub-region of memory 125 corresponding to the network context (so that the mbuf data structure can be used later by another execution thread). The execution thread then puts the data packet on a socket and calls TCP module 234 (Step 692). A counter data structure (such as 830 shown in FIG. 8) for the network context is incremented to indicate that the network context performed a read request.

TCP module 234 receives the packet, adds a TCP header, and hands off the packet to IP module 236. IP module 236 looks at the destination address in the data packet and sends the data packet to an appropriate network driver 244. The network driver 244 transmits the packet over the network 118 to the source network device (such as client 170).

If the data are not in the reply cache (in step 680), execution thread sends a message data structure to the file system (step 682). Exemplary message data structures 820 are shown in FIG. 8. Each message data structure is allocated to a network context. The message data structure is used to communicate with the file system. The message data structure may include a request instructing the file system to perform an access request (read or write data). For example, a request may indicate: read 100 bytes at offset 20 from a file (identified by a file name). Importantly, the message data structure is associated with the network context to which the data packet is queued so that no other execution thread can access the same message data structure.

File system 210, in turn, uses a disk storage module and then a disk access module (not shown in FIGS. 1-8) to load the requested data in memory 125 for processing by the storage system 120. Application layer obtains the network context ID to which the data request had first arrived, from a shared data structure between the TCP layer and application layer (the data structure is not shown in Figures). The application layer 220 queues the response to the network context as a work item to the execution thread. The execution thread then performs TCP and IP processing prior to sending the data packet to network driver 244. The network driver 244 transmits the packet over the network 118 to the source network device (such as client 170). This completes processing of the data packet (step 683).

Figure 3:
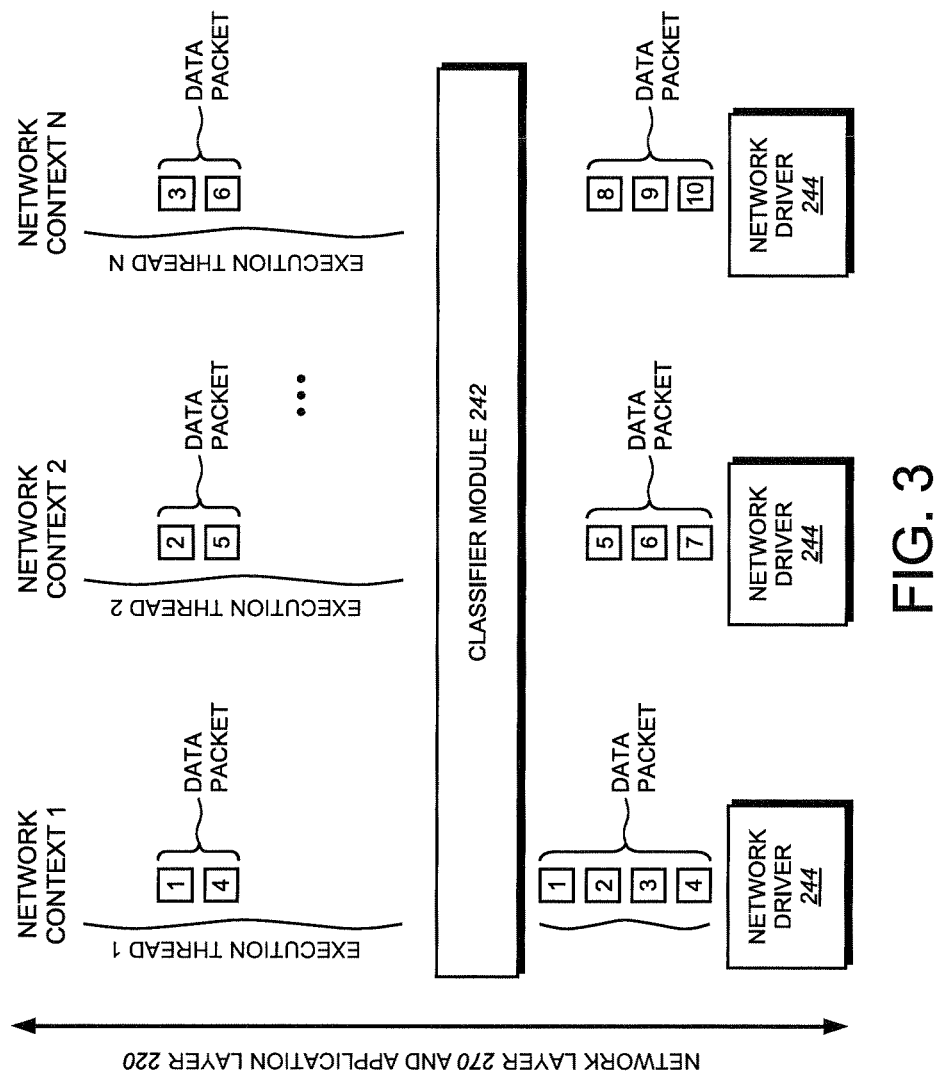
FIG. 3 is a block diagram of distribution of data packets among network contexts according to an embodiment of the present invention.

Referring now to FIG. 3, it illustrates execution thread 1, execution thread 2, and execution thread n, which are executed in the storage system 120 across the network layer 270 and the application layer 220. Each execution thread (1 though n) is associated with its own network context. For example, execution thread 1 is associated with network context 1, execution thread 2 is associated with network context 2, and execution thread n is associated with network context n. As described herein, each network context represents a logical entity to which one or more data packets are queued for execution. Each network context is associated with its own pool of resources (e.g., various network and application layer data structures). When a data packet arrives, network driver 244 calls the classifier module 242 for identifying a network context to which the data packet will be queued. As shown in FIG. 3, classifier module 242 queues data packets to various network contexts. Thus, a data packet queued to a particular network context is executed within that network context by an execution thread across the network layer and the application layer. The execution thread uses data structures assigned to the network context to process a data packet.

Thus, a novel mechanism is provided by which processing of a data packet by the network layer 270 and application layer 220 is combined into the same execution thread. Since a single CPU can perform processing across the application layer and network layer, the need to move a thread from one CPU to another is eliminated. This in turn, allows other CPUs in the multi-processor system to be utilized by processing other execution threads. As a result, throughput of a multi-processor system increases. Furthermore, since each execution thread is associated with its own pool of resources and no two threads can access the same resource, a plurality of execution threads can run simultaneously in the multi-processor system without the need to lock the resources.

The present invention can be adapted to multi-processor systems that can be implemented as a network-attached storage (NAS) device (that can provide clients with a file-level access to data stored in a set of mass storage devices) or as a Storage Area Network (SAN) device that can provide clients with a block-level access to stored data. Those of skill in the art would understand that although embodiments of the present invention were described in the context of using hash functions, any other suitable method for turning data into another number can be used with the present invention.

Furthermore, the use of the phrase "one embodiment" throughout does not necessarily mean the same embodiment.

Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by apparatuses for performing the operations herein. These apparatuses may be specially constructed for the required purposes or they may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for processing tasks of a protocol stack on a multi-processor system, comprising:

creating, at initialization of the multi-processor system, a number of network context data structures equal to a number of processing devices;

allocating a memory resource for each network context so that an execution thread queued to a particular network context accesses the memory resource allocated for the particular network context, the execution thread associated with a network connection data structure representing one or more transport layer connections queued to the particular network context, the memory resource allocated for the particular network context represents the network connection data structure, the network connection data structure comprising a transport layer connection table, wherein each entry in the transport layer connection table references a process control block data structure (PCB), wherein each PCB associated with a transport layer connection is accessed by the execution thread processing a task queued to the particular network context; and assigning a single processing device of the number of processing devices in the multi-processor system to process the execution thread using the memory resource and processing of the execution thread across layers of the protocol stack, thereby not requiring a lock of the memory resource.

2. The method of claim 1, further comprising:

receiving, by a network layer, a data packet to perform the task, determining a network context ID to queue the data packet, the context ID determined using information indicated in the data packet, the information selected from a group consisting of a source address, a source port, a destination address, a destination port, and combinations thereof; performing network processing of the data packet using the memory resource, the memory resource associated with the network context ID;

providing, by the network layer, to an application layer, the network context ID and the memory resource associated with the network context ID to further process the data packet; and processing, by the application layer, the data packet using data structures associated with the network context so that the task is executed by the single processing device, the application layer comprising a protocol chosen from a group consisting of HTTP, NFS, CIFS, RDMA over TCP/IP, and iSCSI.

3. The method of claim 1, wherein the memory resource allocated for the particular network context represents a message instructing a file system to access a file, the message processed by the task queued to the particular network context.

4. The method of claim 1, wherein the memory resource allocated for the particular network context represents a data structure for holding a data packet, the packet processed by the task queued to the particular network context.

5. The method of claim 1, wherein the memory resource allocated for the particular network context represents a counter data structure that indicates a number of processed I/O requests for the particular network context.

6. The method of claim 1, further comprising storing memory resources for network contexts in sub-regions of memory of the multi-processor system such that each memory sub-region maintains memory resources corresponding to the particular network context.

7. The method of claim 1, wherein processing the execution thread across layers comprises processing the execution thread across a network layer configured to perform network processing of the task and an application layer configured to perform application services.

8. The method of claim 1, wherein the execution thread is processed by one processing device of the number of processing devices across layers of the protocol stack so that the processing of the thread is not divided among two or more processing devices in the multi-processor system.

9. The method of claim 1, further comprising:

providing a network context identification (ID) to an application layer of the multi-processor system while processing the execution thread so that the thread is processed at the application layer in the particular network context by using resources allocated to the particular network context identified by the network context ID, wherein the context ID identifies the particular network layer connection, wherein context ID is determined using information indicated in a data packet, the information selected from a group consisting of a source address, a source port, a destination address, a destination port, and combinations thereof.

10. A method for processing tasks of a protocol stack on a multi-processor system, comprising:

maintaining a number of network context data structures equal to a number of processing devices that process one or more tasks assigned to a particular network context;

maintaining memory resources for each network context so that a single execution thread that process a first task queued to a first network context accesses a memory resource allocated for the first network context, the memory resource represents a network connection data structure, the network connection data structure comprising a transport layer connection table, wherein each entry in the transport layer connection table references a process control block data structure (PCB), wherein each PCB associated with a transport layer connection is accessed by the execution thread processing a task queued to the particular network context; and processing, by a single processing device of the number of processing devices, the single execution thread for the first task using the memory resources for the first network context and processing the single execution thread for the first task across a network layer and an application layer of the multi-processor system, wherein each network context is associated with a transport layer connection for a lifetime of the connection.

11. The method of claim 10, further comprising storing the memory resources for the first network context in a sub-region of memory of the multi-processor systems such that each memory sub-region maintains the memory resources corresponding to a single network context.

12. The method of claim 10, wherein processing the single execution thread does not lock the memory resources.

13. A system for processing tasks of a protocol stack, the system comprising:

a plurality of network context data structures maintained in a memory, equal to a number of processing devices for processing tasks assigned to a particular network context;

a plurality of memory resources, each resource associated with a network context so that a single execution thread processing a task queued to a particular network context accesses memory resources allocated for that network context, the protocol stack comprising a transport layer and an application layer, each network context associated with a transport layer connection for a lifetime of that connection;

two or more processing devices for processing tasks assigned to the particular network context, each processing device assigned to process a single execution thread for a task using the allocated memory resources, wherein a memory resource of the plurality of memory resources allocated for the particular network context represents a transport control protocol (TCP) data structure accessed by the single execution thread processing tasks queued to the particular network context, wherein the TCP data structure represents an array of indexes, each index corresponding to a linked list of one or more process control blocks (PCB) storing data about processing the task; and processing the execution thread for the task across layers of the protocol stack, whereby the processing is performed without requiring to lock the allocated memory resources.

14. The system of claim 13, wherein a memory resource of the plurality of memory resources allocated for the particular network context represent a message data structure for passing data to and from a file system to process the task queued to the particular network context.

15. The system of claim 13, wherein a memory resource of the plurality of memory resources allocated for the particular network context represents a data structure for holding a data packet including the task queued to the particular network context, the particular network context is determined using information indicated in the data packet, the information selected from a group consisting of a source address, a source port, a destination address, a destination port, and combinations thereof.

16. The system of claim 15, further comprising:

one or more network drivers configured to receive one or more data packets over a network to process the task and to forward the data packet to a classifier module; and the classifier module configured to distribute the received data packets among one or more of the network contexts and to queue the data packets to the one or more network contexts for processing.

17. The system of claim 13, wherein a memory resource of the plurality of memory resources allocated for the particular network context represents a counter data structure that indicates a number of processed I/O requests for the particular network context.

18. The system of claim 13, wherein the plurality of memory resources are maintained in sub-regions of the memory such that each memory sub-region is associated with a corresponding network context.

* * * * *